US007747891B2

(12) United States Patent
Cheng et al.

(10) Patent No.: US 7,747,891 B2
(45) Date of Patent: Jun. 29, 2010

(54) INVERTER CONTROL CIRCUIT

(75) Inventors: Ying-Chang Cheng, Taipei Hsien (TW); Chin-Biau Chung, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 905 days.

(21) Appl. No.: 11/593,111

(22) Filed: Nov. 6, 2006

(65) Prior Publication Data

US 2008/0109666 A1 May 8, 2008

(51) Int. Cl.
*G06F 1/00* (2006.01)
*G09G 5/00* (2006.01)
*G09G 5/10* (2006.01)

(52) U.S. Cl. ........................ 713/500; 345/204; 345/690

(58) Field of Classification Search ................. 713/500; 345/204, 690

See application file for complete search history.

(56) References Cited

U.S. PATENT DOCUMENTS 5,640,313 A * 6/1997 Takehara et al. .............. 363/97
6,362,578 B1 * 3/2002 Swanson et al. ............ 315/307
2007/0080911 A1 * 4/2007 Liu et al. ...................... 345/82
2007/0126690 A1 * 6/2007 Chae .......................... 345/102

* cited by examiner

*Primary Examiner*—Mark Connolly
(74) *Attorney, Agent, or Firm*—Muncy, Geissler, Olds, & Lowe, PLLC

(57) ABSTRACT

An inverter control circuit is used to control a switch and a transformer in front of a light-emitting unit and then adjust the driving power for the light-emitting unit and modify the luminant state of the light-emitting unit and comprises: a first control unit and a second control unit both having equivalent electronic elements. The first control unit and the second control unit have a signal generator and a signal synthesizer circuit. According to a signal fed back by the light-emitting unit and a dimming signal, the first signal generator outputs first working signals via the signal synthesizer circuit of the first control unit to determine the turn-on time of the switch. According to the first working signals and via the signal synthesizer circuit of the second control unit, the second signal generator outputs second working signals to the switch to determine the resonance frequency of the transformer.

7 Claims, 2 Drawing Sheets

INVERTER CONTROL CIRCUIT

FIELD OF THE INVENTION

The present invention relates to an inverter control circuit, particularly to a circuit, which utilizes two control units both having equivalent circuit structures to adjust the luminant state of a light-emitting unit.

BACKGROUND OF THE INVENTION

In the conventional power supply of a backlight module, the inverter control circuit containing two different PWM control units is used to adjust the luminant state of the backlight module. The first PWM controller thereof is a dimming regulator with a working frequency of about 120~220 Hz and used to adjust the brightness of the backlight module. The second PWM controller thereof has a PWM signal generator and a logic circuit and has a working frequency of about 53 k~75 k Hz and is used to adjust the working cycle of the backlight module.

Different PWM controllers require their respective manpower, time and costs in their design, stock and material preparation. Besides, the structures of the circuits are more complicated. Further, if two identical PWM controllers are mistakenly installed in a power supply, the electronic device will malfunction or be damaged. Furthermore, as the two different PWM controllers are non-interchangeable, the insufficiency of either one in material preparation will cause the delay of fabrication. Therefore, the design of using two different PWM controllers has become a problem of the manufacturers. An inverter control circuit, which is simple in design and is easily managed in material preparation, is thus desired by the field concerned.

SUMMARY OF THE INVENTION

The primary objective of the present invention is to provide a simple inverter control circuit, which is used to control the luminant state of a light-emitting unit, wherein a first control unit and a second control unit both having equivalent electronic elements are used to control the turn-on time of a switch and the resonance frequency of a transformer. Thus, manufacturers needn't design the control unit for controlling the turn-on time of a switch and the control unit for controlling the resonance frequency of a transformer separately. Thereby, the manpower, the fabrication time and the cost are reduced.

To achieve the abovementioned objective, the present invention proposes an inverter control circuit, which is used to control a switch and a transformer in front of a light-emitting unit and then adjust the driving power for the light-emitting unit and modify the luminant state of the light-emitting unit. The inverter control circuit of the present invention comprises: a first control unit and a second control unit, and both have equivalent electronic elements. Either of the first control unit and the second control unit has a signal generator and a signal synthesizer circuit. According to a signal fed back by the light-emitting unit and a dimming signal, the signal generator of the first control unit outputs first working signals via the signal synthesizer circuit of the first control unit to determine the turn-on time of the switch. According to the first working signals, the signal generator of the second control unit outputs second working signals to the switch via the signal synthesizer circuit of the second control unit to determine the resonance frequency of the transformer.

DETAILED DESCRIPTION OF THE PREFERRED EMBODIMENTS

The technical contents of the present invention will be described in detail in cooperation with the drawings below.

Figure 1:
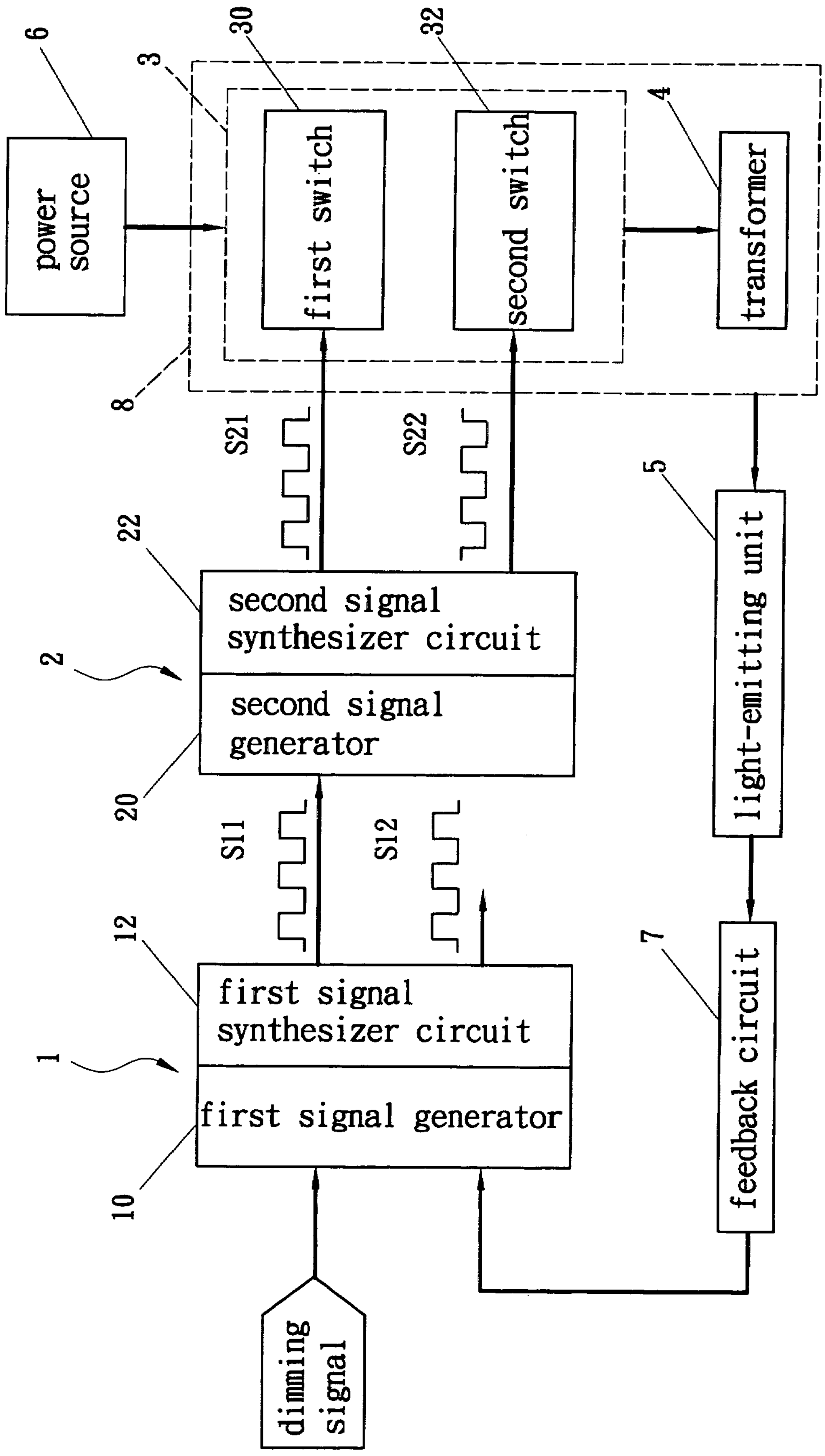
FIG. 1 is a block diagram schematically showing a preferred embodiment of the present invention.
Figure 2:
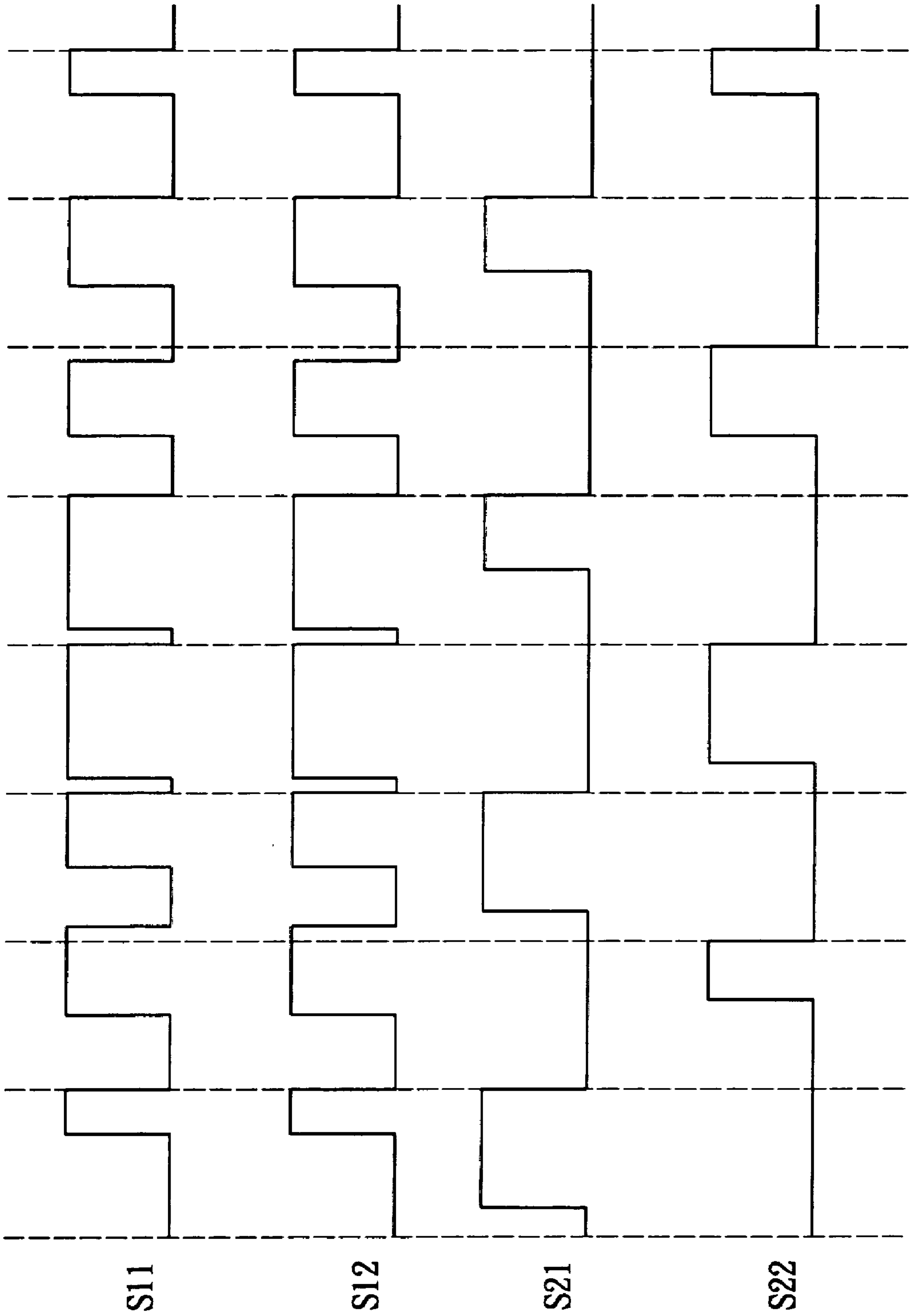
FIG. 2 is a diagram showing the waveforms of a preferred embodiment of the present invention.

Refer to FIG. 1 a block diagram schematically showing a preferred embodiment of the present invention, and refer to FIG. 2 a diagram showing the waveforms of a preferred embodiment of the present invention.

The present invention pertains to an inverter control circuit, which is used to control a switch 3 and a transformer 4 in front of a light-emitting unit 5 and then adjust the driving power for the light-emitting unit 5 and modify the luminant state of the light-emitting unit 5. In this embodiment, the switch 3 and the transformer 4 are installed inside a driver unit 8, and the driver unit 8 is a push-pull type driver circuit. The switch 3 utilizes its turn-on time to adjust the driving power output by a power source 6 and has a first switch 30 and a second switch 32. The inverter control circuit of the present invention comprises: a first control unit 1 and a second control unit 2 with both having equivalent electronic elements, and either of the first control unit 1 and the second control unit 2 has a signal generator and a signal synthesizer circuit.

Thus, the manufacturer will only spend the manpower, time and cost of one set of control unit on designing the circuit architecture of the present invention. Further, as the first control unit 1 and the second control unit 2 have equivalent electronic elements and are interchangeable, the manufacturer can be free from the error occurring in preparing different control units or in the fabrication of the inverter. Thus, the manpower, space and cost spent on material preparation will be obviously reduced, and the competitiveness will be greatly promoted.

The first control unit 1 has a first signal generator 10 and a first signal synthesizer circuit 12. According to a signal fed back by the light-emitting unit 5 via a feedback circuit 7 and a dimming signal, the first signal generator 10 outputs first working signals via the signal synthesizer circuit 12 to determine the turn-on time of the switch 3. In this embodiment, the working frequency of the first control unit 1 is 40~60 Hz.

The second control unit 2 has a second signal generator 20 and a second signal synthesizer circuit 22. According to either of the first working signals S11 and S12 and via the second signal synthesizer circuit 22, the second signal generator 20 of the second control unit 2 outputs second working signals S21 and S22 to the switch 3 to determine the resonance frequency of the transformer 4. The amplitude of the second working signal S21 or S22 determines the resonance frequency of the transformer 4. In this embodiment, the working frequency of the second control unit 2 is 53 k~75 k Hz.

In this embodiment, either of the first control unit 1 and the second control unit 2 have a first mode and a second mode. In the first mode, the first control unit 1 and the second control unit 2 output two iso-directional working signals. In the second mode, the first control unit 1 and the second control unit 2 outputs two aniso-directional working signals. When the first control unit 1 is set in the first mode and the second control unit 2 is set in the second mode, the first control unit 1 outputs two iso-directional first working signals S11 and S12, and according to either of the first working signals S11 and S12, the second control unit 2 outputs two aniso-directional working signals S21 and S22 separately to the first switch 30 and the second switch 32 to control the turn-on time of the first switch 30 and the second switch 32 and determine the resonance frequency of the transformer 4. Thereby, the driving power and the luminant state of the light-emitting unit 5 can be adjusted.

In summary, the present invention utilizes the first control unit 1 and the second control unit 2 both having equivalent electronic elements to determine the turn-on time of the switch 3 and the resonance frequency of the transformer 4 and then adjust the ruminant state of the light-emitting unit 5. In the present invention, the manufacturer can be free from the fabrication error and management error caused by using different control units. As the first control unit 1 and the second control unit 2 are interchangeable, the manpower, time and cost spent on material preparation will be obviously reduced, and the competitiveness will be greatly promoted. Therefore, the present invention indeed possesses novelty and non-obviousness and meets the conditions for a patent. Thus, the inventor files the patent application. It will be greatly appreciated that the patent should be approved fast.

Those described above are the preferred embodiments to exemplify the present invention. However, it is not intended to limit the scope of the present invention. Any equivalent modification and variation according to the spirit of the present invention is to be also included within the scope of the present invention.

What is claimed is:

1. An inverter control circuit, which is used to control a switch and a transformer in front of a light-emitting unit and then adjust the driving power for said light-emitting unit and modify the luminant state of said light-emitting unit, comprising:

a first control unit and a second control unit, both having equivalent electronic elements, wherein either of said first control unit and said second control unit have a signal generator and a signal synthesizer circuit; according to a signal fed back by said light-emitting unit and a dimming signal, said signal generator of said first control unit outputs first working signals via said signal synthesizer circuit of said first control unit to determine the turn-on time of said switch; according to said first working signals and via said signal synthesizer circuit of said second control unit, said second signal generator of said second control unit outputs second working signals to said switch to determine the resonance frequency of said transformer.

2. The inverter control circuit according to claim 1, wherein the working frequency of said first control unit is 40~60 Hz.

3. The inverter control circuit according to claim 1, wherein the working frequency of said second control unit is 53 k~75 k Hz.

4. The inverter control circuit according to claim 1, wherein the amplitude of said second working signal determines the resonance frequency of the transformer.

5. The inverter control circuit according to claim 1, wherein said first control unit and/or said second control unit has a first mode and a second mode; in said first mode, said first control unit and/or said second control unit outputs two iso-directional said first and/or second working signals; in said second mode, said first control unit and/or said second control unit outputs two aniso-directional said working signals.

6. The inverter control circuit according to claim 5, wherein said switch has a first switch and a second switch.

7. The inverter control circuit according to claim 5, wherein said first control unit is set in said first mode, and said second control unit is set in said second mode.

* * * * *